(12) United States Patent
Wang et al.

(10) Patent No.: US 9,364,692 B2
(45) Date of Patent: Jun. 14, 2016

(54) INFLATABLE LIFESAVING DEVICE

(71) Applicants: Feng Wang, Ann Arbor, MI (US);
Wayne Li, Chadds Ford, PA (US);
Yunhua Hu, Cary, NC (US)

(72) Inventors: Feng Wang, Ann Arbor, MI (US);
Wayne Li, Chadds Ford, PA (US);
Yunhua Hu, Cary, NC (US)

(\*) Notice: Subject to any disclaimer, the term of this patent is extended or adjusted under 35 U.S.C. 154(b) by 235 days.

(21) Appl. No.: 14/269,094

(22) Filed: May 3, 2014

(65) Prior Publication Data
US 2015/0314142 A1    Nov. 5, 2015

(51) Int. Cl.
| A62B 1/22 | (2006.01) |
| B64D 25/00 | (2006.01) |
| A62B 1/02 | (2006.01) |
| B64D 17/00 | (2006.01) |
| B64D 1/14 | (2006.01) |

(52) U.S. Cl.
CPC ... *A62B 1/22* (2013.01); *A62B 1/02* (2013.01); *B64D 1/14* (2013.01); *B64D 17/00* (2013.01); *B64D 25/00* (2013.01)

(58) Field of Classification Search
CPC .......... B64D 1/14; B64D 17/78; B64D 25/00; B64D 25/02; B64D 25/06; B64D 25/08; B64D 25/12; A62B 1/00; A62B 1/02
See application file for complete search history.

(56) References Cited

U.S. PATENT DOCUMENTS

| 1,042,327 | A | * | 10/1912 | Costanzo | B63C 9/06 2/2.14 |
| 3,520,503 | A | * | 7/1970 | McGehee | B64D 1/14 188/268 |
| 3,921,944 | A | * | 11/1975 | Morrison | A62B 1/22 2/456 |
| 4,089,065 | A | * | 5/1978 | McGee | A41D 13/018 2/2.14 |
| 4,508,294 | A | * | 4/1985 | Lorch | B64D 25/02 244/122 AG |
| 4,637,074 | A | * | 1/1987 | Taheri | A41D 13/018 2/456 |
| 4,825,469 | A | * | 5/1989 | Kincheloe | A41D 13/018 2/16 |
| 4,977,623 | A | * | 12/1990 | DeMarco | A41D 13/018 2/456 |
| 5,500,952 | A | * | 3/1996 | Keyes | A41D 13/018 2/465 |
| 5,568,902 | A | * | 10/1996 | Hurley, Jr. | B64D 1/14 244/138 R |
| 5,781,936 | A | * | 7/1998 | Alaloof | A41D 13/018 2/456 |
| 6,213,429 | B1 | * | 4/2001 | Chu | B64D 25/02 244/138 R |
| 6,607,166 | B1 | * | 8/2003 | Pichkhadze | B64D 1/14 244/138 R |
| 6,705,572 | B1 | * | 3/2004 | Christopher | B64D 17/72 244/142 |
| 6,708,927 | B2 | * | 3/2004 | Chen | A62B 1/22 182/230 |
| 7,343,632 | B2 | * | 3/2008 | Neron | A41D 13/018 2/456 |
| 8,833,517 | B2 | * | 9/2014 | Filatov | A62B 1/22 182/3 |
| 9,027,886 | B1 | * | 5/2015 | Mechels | B64D 17/60 244/151 R |

\* cited by examiner

*Primary Examiner* — Christopher P Ellis
*Assistant Examiner* — Michael Wang

(57) ABSTRACT

An inflatable lifesaving device is designed to provide a user with an apparatus to escape a high rise building in emergency situations in a sufficiently rapid manner. It is simply composed of a hemisphere including a plurality of independent cell airbags, internal hoses, and check valves, a parachute integrated with the hemisphere, an air supply system, an external hose, a quick release hose coupler, a harness mounted on the body of the user, a connection rope that connects the harness to the inside of the building, a rope quick release to separate the connection rope, a descent rope, a backpack. To operate the inflatable lifesaving device, the user wearing the harness with the backpack exits a window or a balcony with the harness connected to the inside of the building through the connection rope with the release device. The air supply system is then turned on and high pressure air inflates and opens up the hemisphere and the parachute so that they are gradually formed from the back of the user to the front, and eventually the user is surrounded by them. after that, the external hose and the connection rope are released. As a result, the user will move down with the hemisphere and the parachute.

3 Claims, 3 Drawing Sheets

INFLATABLE LIFESAVING DEVICE

FIELD OF THE INVENTION

The present invention relates generally to a personal safety device for quickly exiting a high rise building in the event of an emergency.

BACKGROUND OF THE INVENTION

Escaping from a high rise building during a fire or other emergency is very challenging for everyone involved in such situation. People could be injured or even die in case of lacking emergency lifesaving systems. Therefore, having a safety device to immediately escape the high rise building in emergency conditions is a necessity for residents. The various lifesaving systems have been patented. Among these are apparatuses using ropes, air bags, parachutes, outside elevators, tubes, etc. The present invention is a combination of the air bag and the parachute.

SUMMARY OF THE INVENTION

The purpose of the present invention is to produce an inflatable safety device to escape a high rise building in emergency situations in a sufficiently rapid manner.

The inflatable lifesaving device of the present invention is shown in design drawings. It is composed of a hemisphere including a plurality of independent cell airbags, internal hoses, and check valves, a parachute integrated with the hemisphere and used to reduce the terminal velocity, an air supply system, external hoses, a quick release hose coupler, a harness mounted on a human body, a connection rope that connects the harness to the inside of the building, a rope quick release to separate the connection rope, a descent rope, a backpack that packs the hemisphere and the parachute and is connected to the harness. The air supply system could be a battery powered air compressor, a stored gas inflator, a pyrotechnic inflator, or combinations thereof. All the cell airbags and the parachute fill with the high pressure air under working conditions. The check valves carried by the cell airbags are used to control an inflation process and ensure that when one cell airbag is broken, other downstream airbags still work.

The operating procedure is as follows. The user first wear the harness with the backpack and fix the other end of the connection rope to inside of the building, and then exits a window or a balcony through the connection rope. The portion of the external hose with the quick release hose coupler also comes out of the building. The rest of the external hose and air supply system will stay inside of the building. After that, the air supply system is turned on by the user remotely or by someone else and the high pressure air inflates and opens up the hemisphere and the parachute so that they are gradually formed from the back of the user to the front, and eventually the user is surrounded by the hemisphere and the parachute. Once the air pressure reaches the designated value, the external hose is automatically disconnected by the quick release hose coupler. When ready, the connection rope is separated by the rope quick release. As a result, the user will move down with the hemisphere and the parachute. In case the inflatable lifesaving device is stuck on trees, and the like, the descent rope will be used to make the user descend to the ground. As soon as the ground is reached, the user will unbuckle the harness, release the high pressure air, get out of the hemisphere, and leave the scene.

DESCRIPTION OF THE PREFERRED EMBODIMENT

Figure 1:
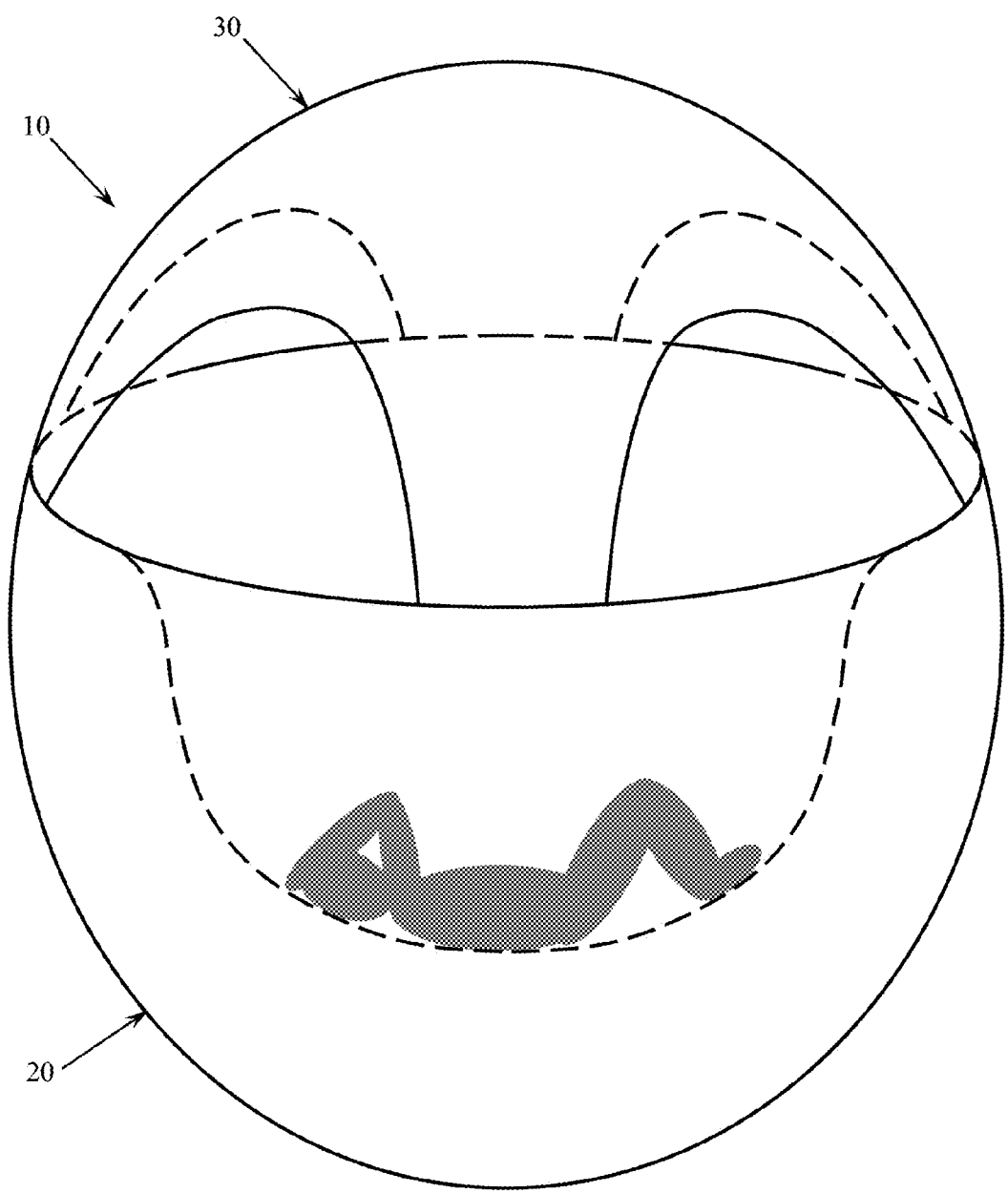
FIG. 1 is a perspective view of the deployed inflatable lifesaving device.
Figure 2:
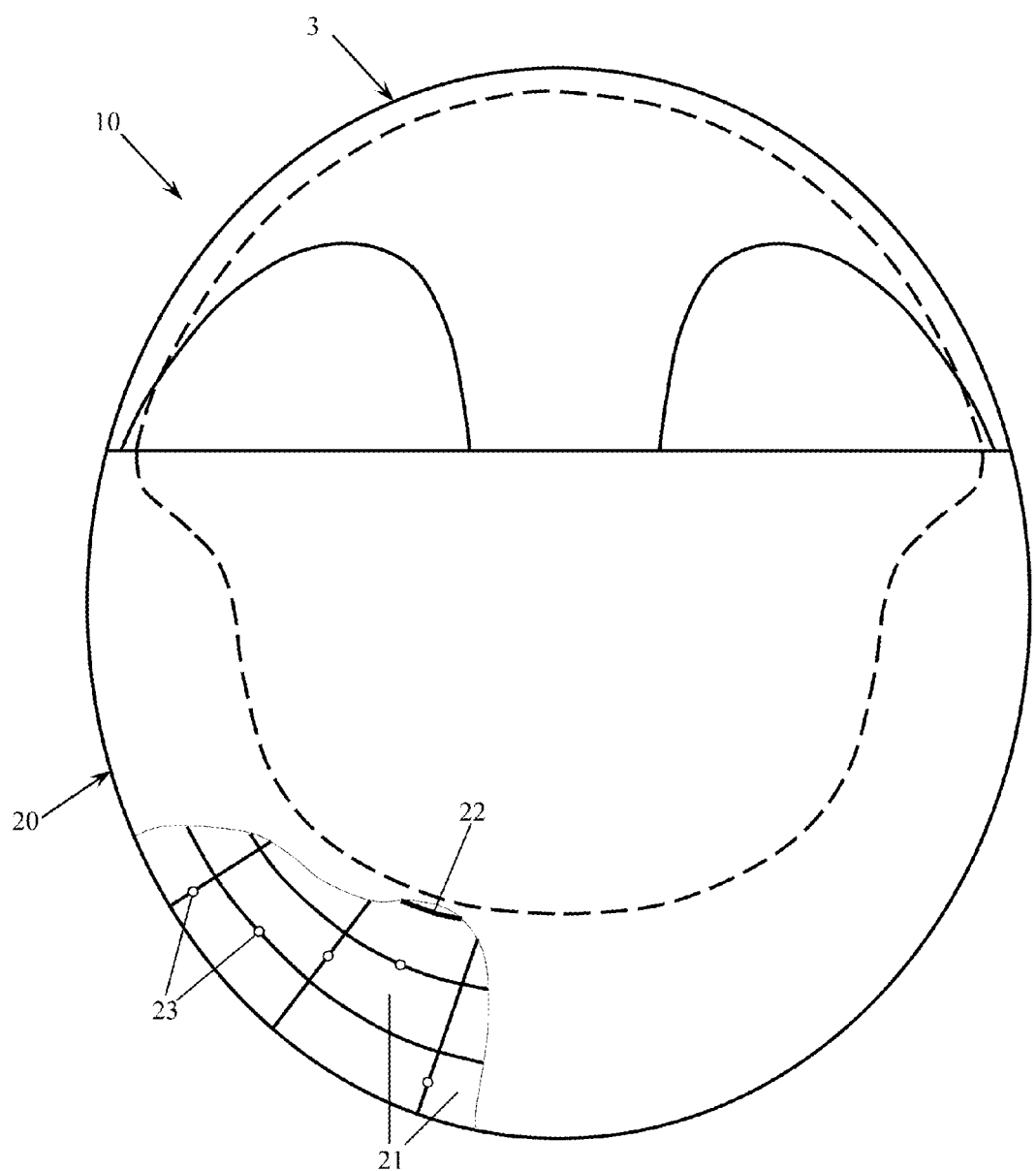
FIG. 2 is a side view of the deployed inflatable lifesaving device.
Figure 3:
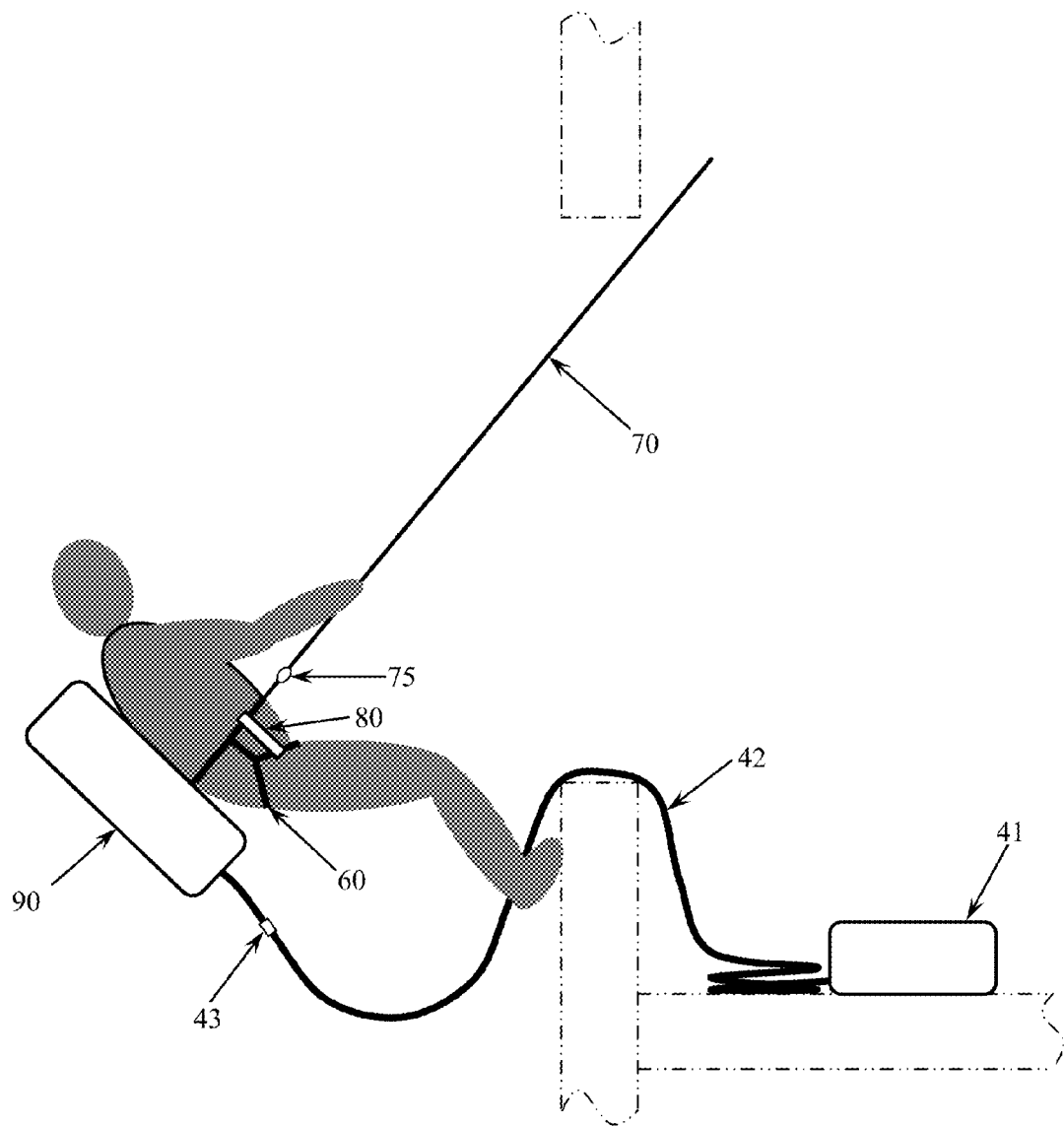
FIG. 3 shows the position before deploying the hemisphere and the parachute.

An embodiment of the inflatable lifesaving device 10 of the present invention is illustrated in FIG. 1-3, including a hemisphere 20 comprising a plurality of independent cell airbags 21, internal hoses 22 and check valves 23, a parachute 30 integrated with the hemisphere 20 and used to reduce the terminal velocity, an air supply system 41 that could be a battery powered air compressor, a stored gas inflator, a pyrotechnic inflator, or combinations thereof, external hoses 42, a quick release hose coupler 43, a harness 60 mounted on a human body, a connection rope 70 that connects the harness 60 to the inside of the building, a rope quick release 75 to separate the connection rope 70, a descent rope 80, a backpack 90 that packs the hemisphere 20 and parachute 30 and is connected to the harness 60. All the cell airbags 21 and the parachute 30 fill with the high pressure air under working conditions. The check valves 23 are carried by the cell airbags 21 and are utilized to control an inflation process and ensure that when one cell airbag 21 is broken, other downstream airbags 21 still work.

To operate the inflatable lifesaving device 10, the user first wears the harness 60 that is connected to the backpack 90 and fix the other end of the connection rope 70 to inside of the building and then exits a window or a balcony. The portion of the external hose 42 also comes out of the building. The rest of the hose 42, the air supply system 41 will stay inside of the building. The situation is shown in FIG. 3. After that, the air supply system 41 is turned on by user remotely or by someone else inside the building and the high pressure air inflates and opens up the hemisphere 20 and the parachute 30 so that the hemisphere 20 and the parachute 30 are gradually formed from the back of the user to the front, and eventually the user is surrounded by the hemisphere 20 and the parachute 30. Once the air pressure reaches the designated value, the external hose 42 is automatically disconnected by the quick release hose coupler 43. When ready, the connection rope 70 is separated by the rope quick release 75. As a result, the user will move down with the hemisphere 20 and the parachute 30 as shown in FIG. 1. In case the inflatable lifesaving device 10 is stuck on trees, and the like, the descent rope 80 will be used to make the user descend to the ground. As soon as the ground is reached, the user will unbuckle the harness 60, release the high pressure air, get out of the hemisphere 20, and leave the scene.

It is to be understood that the present invention is not limited to the above-mentioned embodiments, but encompasses any and all embodiments within the following scope of the claims.

What is claimed is:

1. An inflatable lifesaving device, for providing a user with a safe means to escape a high rise building in a sufficiently rapid manner in the event of an emergency, comprising:

a hemisphere consisting of a plurality of independent cell airbags, internal hoses, and check valves carried by said cell airbags and used to control an inflation process and ensure that when one said cell airbag is broken, other said downstream cell airbags still work;

a parachute integrated with said hemisphere and used to reduce the terminal velocity;

an air supply system that could be a battery powered air compressor, a stored gas inflator, a pyrotechnic inflator, or combinations thereof;

an external hose connecting said air supply system to said hemisphere;

a quick release hose coupler carried by said external hose;

a harness mounted on the body of the user;

a connection rope that connects said harness to the inside of the building;

a rope quick release for separating said connection rope;

a backpack that packs said hemisphere and said parachute and is connected to said harness; and wherein to operate said inflatable lifesaving device, the user first wears said harness that is connected to said backpack and fix the other end of said connection rope to inside of the building and then exits a window or a balcony, the portion of said external hose with said quick release hose coupler also comes out of the building, the rest of said external hose and said air supply system will stay inside of the building, after that, said air supply system is turned on by the user remotely or by someone else inside the building and high pressure air inflates and opens up said hemisphere and said parachute so that said hemisphere and said parachute are gradually formed from the back of the user to the front, and eventually the user is surrounded by said hemisphere and said parachute, once the air pressure reaches the designated value, said external hose is automatically disconnected by said quick release hose coupler, when ready, said connection rope is separated by said rope quick release, as a result, the user will move down with said hemisphere and said parachute, as soon as the ground is reached, the user will unbuckle the harness, release the high pressure air, get out of said hemisphere, and leave the scene.

2. The inflatable lifesaving device of claim 1, wherein each said cell airbag and said parachute are made of an airtight, fireproof, high strength, light, and thin material.

3. The inflatable lifesaving device of claim 1, wherein further including a descent rope attached to said harness and used to make the user descend to the ground in case said inflatable lifesaving device is stuck on trees, and the like.

\* \* \* \* \*